United States Patent
Kaneko et al.

(10) Patent No.: US 7,205,071 B2
(45) Date of Patent: Apr. 17, 2007

(54) SECONDARY BATTERY AND CAPACITOR UTILIZING INDOLE COMPOUNDS

(75) Inventors: Shinako Kaneko, Sendai (JP); Toshihiko Nishiyama, Sendai (JP); Hiroyuki Kamisuki, Sendai (JP); Masaya Mitani, Sendai (JP); Masato Kurosaki, Tokyo (JP); Tomoki Nobuta, Sendai (JP); Yuji Nakagawa, Tokyo (JP)

(73) Assignee: NEC Tokin Corporation, Miyagi (JP)

( * ) Notice: Subject to any disclaimer, the term of this patent is extended or adjusted under 35 U.S.C. 154(b) by 436 days.

(21) Appl. No.: 10/365,550

(22) Filed: Feb. 13, 2003

(65) Prior Publication Data

US 2003/0186124 A1    Oct. 2, 2003

(30) Foreign Application Priority Data

Feb. 26, 2002    (JP)    ............................. 2002-049706

(51) Int. Cl.
   *H01M 4/58*    (2006.01)
   *H01M 4/60*    (2006.01)
(52) U.S. Cl. .................... 429/218.1; 429/213; 429/212
(58) Field of Classification Search ............. 429/218.1, 429/213, 212
   See application file for complete search history.

(56) References Cited

U.S. PATENT DOCUMENTS 6,749,963 B2 *   6/2004   Kurosaki et al. ........... 429/213

2002/0058185 A1    5/2002   Kurosaki et al.

FOREIGN PATENT DOCUMENTS

| EP | 1 189 295 | 3/2002 |
|---|---|---|
| EP | 1 205 995 | 5/2002 |
| JP | 2001-35494 | 2/2001 |
| JP | 2001-118577 | 4/2001 |
| JP | 2001261680 | * 9/2001 |

OTHER PUBLICATIONS

Mount, Andrey R.; Robertson, Mark T.,"The redox reaction and induced structural changes of 5-substituted indole films," 1999, Royal Society of Chemistry, Physical Chemistry Chemical Physics 1(22), pp. 5169-5177.*

* cited by examiner

*Primary Examiner*—Tracy M. Dove
*Assistant Examiner*—Helen O. K. Chu
(74) *Attorney, Agent, or Firm*—Young & Thompson (57) ABSTRACT

A secondary battery and capacitor includes as an active material of an electrode a compound having a trimer structure comprising three structure units of one or more kind of indole compounds selected from indole and indole derivatives and a condensed polycyclic structure having a six-membered ring composed of atoms of the second and the third position of the each three structure units, wherein the active material comprises as the compound a first compound having a trimer structure wherein any bonds between the structure units are formed among the second position of one structure unit and the third position of the other structure unit and a second compound having a trimer structure comprising a bond formed among the second position of one structure unit and the second position of the other structure unit, and a proton is utilized as a charge carrier of the first compound and the second compound.

8 Claims, 4 Drawing Sheets

SECONDARY BATTERY AND CAPACITOR UTILIZING INDOLE COMPOUNDS

BACKGROUND OF THE INVENTION

1. Field of the Invention

The present invention relates to a secondary battery and a capacitor, more particularly utilizing an indole compound as an active material of an electrode and a proton as a charge carrier.

2. Description of the Related Art

Indole polymers are known as excellent materials for an active material of electrode in the light of electromotive force and capacity. However, the battery wherein the indole polymers are utilized as an active material has not been satisfactory in the light of a rapid charge and discharge and a cycle characteristic.

The inventors of the present invention have already proposed an electrochemical cell by Japanese Patent Application Number 2000-282309, wherein trimer compounds of indole or indole derivatives are utilized as an active material of electrode, and have studied further improvement of the performance of the cell since then.

SUMMARY OF THE INVENTION

The purpose of the present invention is to provide a battery and capacitor which have excellent high rate and cycle characteristics as well as sufficient electromotive force and capacity.

According to the first aspect of the present invention, there is provided that a secondary battery comprising as an active material of an electrode a compound having a trimer structure comprising three structure units of one or more kind of indole compounds selected from indole and indole derivatives and a condensed polycyclic structure having a six-membered ring composed of atoms of the second and the third position of the each three structure units, wherein
the active material comprises as the compound
a first compound having a trimer structure wherein any bonds between the structure units are formed among the second position of one structure unit and the third position of the other structure unit and
a second compound having a trimer structure comprising a bond formed among the second position of one structure unit and the second position of the other structure unit, and
a proton is utilized as a charge carrier of the first compound and the second compound.

According to the second aspect of the present invention, there is provided that a secondary battery comprising as an active material of an electrode
a first compound represented by the following general formula(1):

(1)

wherein each R represents a hydrogen atom, a halogen atom, hydroxyl group, carboxyl group, sulfonic acid group, sulfuric acid group, nitro group, cyano group, alkyl group, aryl group, alkoxyl group, amino group, alkylthio group and arylthio group, independently
and a second compound represented by the following general formula(2):

(2)

wherein each R represents a hydrogen atom, a halogen atom, hydroxyl group, carboxyl group, sulfonic acid group, sulfuric acid group, nitro group, cyano group, alkyl group, aryl group, alkoxyl group, amino group, alkylthio group and arylthio group, independently, and
utilizing a proton as a charge carrier of the first compound and the second compound.

According to the third aspect of the present invention, there is provided that the secondary battery as described above, wherein the content ratio based on weight of the first compound and the second compound is that the content of the first compound is equal to or more than 10% of the total amount 100% of these compounds.

According to the fourth aspect of the present invention, there is provided that a secondary battery comprising as an active material of an electrode a compound having a trimer structure comprising three structure units of one or more kind of indole compounds selected from indole and indole derivatives and a condensed polycyclic structure having a six-membered ring composed of atoms of the second and the third position of the each three structure units, wherein
the compound has a trimer structure wherein any bonds between the structure units are formed among the second position of one structure unit and the third position of the other structure unit and
a proton is utilized as a charge carrier of the compound.

According to the fifth aspect of the present invention, there is provided that a secondary battery comprising as an active material of an electrode
a compound represented by the following general formula (1):

(1)

wherein each R represents a hydrogen atom, a halogen atom, hydroxyl group, carboxyl group, sulfonic acid group, sulfuric acid group, nitro group, cyano group, alkyl group, aryl group, alkoxyl group, amino group, alkylthio group and arylthio group, independently, and utilizing a proton as a charge carrier of the compound.

According to the sixth aspect of the present invention, there is provided that the secondary battery as described above, wherein the receipt and release of electrons in accordance with oxidation-reduction reaction of the compound(s) are carried out only by the bonding and elimination of the proton of the compound(s).

According to the seventh aspect of the present invention, there is provided that the secondary battery as described above comprising an aqueous solution or a non-aqueous solution containing $10^{-3}$ mol/l to 18 mol/l of proton as an electrolytic solution.

According to the eighth aspect of the present invention, there is provided that a capacitor comprising as an active material of an electrode a compound having a trimer structure comprising three structure units of one or more kind of indole compounds selected from indole and indole derivatives and a condensed polycyclic structure having a six-membered ring composed of atoms of the second and the third position of the each three structure units, wherein the active material comprises as the compound a first compound having a trimer structure wherein any bonds between the structure units are formed among the second position of one structure unit and the third position of the other structure unit and a second compound having a trimer structure comprising a bond formed among the second position of one structure unit and the second position of the other structure unit, and a proton is utilized as a charge carrier of the first compound and the second compound.

According to the ninth aspect of the present invention, there is provided that a capacitor comprising as an active material of an electrode a first compound represented by the following general formula(1):

(1)

wherein each R represents a hydrogen atom, a halogen atom, hydroxyl group, carboxyl group, sulfonic acid group, sulfuric acid group, nitro group, cyano group, alkyl group, aryl group, alkoxyl group, amino group, alkylthio group and arylthio group, independently and a second compound represented by the following general formula(2):

(2)

wherein each R represents a hydrogen atom, a halogen atom, hydroxyl group, carboxyl group, sulfonic acid group, sulfuric acid group, nitro group, cyano group, alkyl group, aryl group, alkoxyl group, amino group, alkylthio group and arylthio group, independently, and utilizing a proton as a charge carrier of the first compound and the second compound.

According to the tenth aspect of the present invention, there is provided that the capacitor as described above, wherein the content ratio based on weight of the first compound and the second compound is that the content of the first compound is equal to or more than 10% of the total amount 100% of these compounds.

According to the eleventh aspect of the present invention, there is provided that a capacitor comprising as an active material of an electrode a compound having a trimer structure comprising three structure units of one or more kind of indole compounds selected from indole and indole derivatives and a condensed polycyclic structure having a six-membered ring composed of atoms of the second and the third position of the each three structure units, wherein the compound has a trimer structure wherein any bonds between the structure units are formed among the second position of one structure unit and the third position of the other structure unit and a proton is utilized as a charge carrier of the compound.

According to the twelfth aspect of the present invention, there is provided that a capacitor comprising as an active material of an electrode a compound represented by the following general formula (1):

(1)

wherein each R represents a hydrogen atom, a halogen atom, hydroxyl group, carboxyl group, sulfonic acid group, sulfuric acid group, nitro group, cyano group, alkyl group, aryl group, alkoxyl group, amino group, alkylthio group and arylthio group, independently, and utilizing a proton as a charge carrier of the compound.

According to the thirteenth aspect of the present invention, there is provided that the capacitor as described above, wherein the receipt and release of electrons in accordance with oxidation-reduction reaction of the compound(s) are carried out only by the bonding and elimination of the protons of the compound(s).

According to the fourteenth aspect of the present invention, there is provided that the capacitor as described above comprising an aqueous solution or a non-aqueous solution containing $10^{-3}$ mol/l to 18 mol/l of proton as an electrolytic solution.

Hereinafter, the first compound described above including the compound represented by general formula(1) is expressed by the notation "symmetric type trimer" and the second compound including the compound represented by general formula(2) is represented by the notation "asymmetric type trimer", appropriately. Furthermore, these symmetric and asymmetric trimers are represented by the notation "indole trimers", generically.

According to the present invention, a battery and a capacitor having an excellent high rate and cycle characteristic as well as sufficient electromotive force and capacity can be provided.

DETAILED DESCRIPTION OF PREFERRED EMBODIMENTS

Hereinafter, preferred embodiments of the present invention will be described.

The symmetric and asymmetric compounds utilized in the present invention can be prepared from, for example, indole and/or indole derivatives, hereinafter described as an "indole monomer", and from indoline and/or indoline derivatives, hereinafter described as an "indoline monomer", by known electrochemical or chemical methods, for example, those utilizing the known reactions such as electrochemical oxidation, chemical oxidation, condensation reaction and substitution reaction. The indole derivatives are exemplified by those wherein arbitrary hydrogen atoms bonded to the atoms, except for nitrogen, forming a condensed ring of indole are substituted, and the indoline derivatives are exemplified by those wherein arbitrary hydrogen atoms bonded to the atoms forming a condensation ring of indoline except for 5-membered ring are substituted.

Indole or indole derivatives represented by the following general formula(3) can be utilized as the indole monomers and indoline or indoline derivatives represented by the following general formula(4) can be utilized as the indoline monomers.

The symmetric type trimers or asymmetric type trimers which are utilized as electrode materials may be prepared from one kind of the indole monomers or indoline monomers and may be prepared from two or more kinds of the indole monomers or indoline monomers.

(3)

wherein each R represents a hydrogen atom, a halogen atom, hydroxyl group, carboxyl group, sulfonic acid group, sulfuric acid group, nitro group, cyano group, alkyl group, aryl group, alkoxyl group, amino group, alkylthio group and arylthio group, independently.

(4)

wherein each R represents a hydrogen atom, a halogen atom, hydroxyl group, carboxyl group, sulfonic acid group, sulfuric acid group, nitro group, cyano group, alkyl group, aryl group, alkoxyl group, amino group, alkylthio group and arylthio group, independently.

Symmetric type trimers represented by general formula (1) and asymmetric type trimers represented by general formula(2) can be utilized as the indole trimers in the present invention. Each R in these formulas represents a hydrogen atom, a halogen atom, hydroxyl group, carboxyl group, sulfonic acid group, sulfuric acid group, nitro group, cyano group, alkyl group, aryl group, alkoxyl group, amino group, alkylthio group and arylthio group, independently. Substituents represented in general formula(1) and general formula (2) originates from the indole monomers or the indoline monomers utilized as raw materials. The indole trimers either may be prepared from one kind of the indole monomers or indoline monomers, or may be prepared from two or more kinds of the indole monomers or indoline monomers.

The halogen atoms of R in general formula(1) and general formula(2) are, for example, fluorine, chlorine, bromine and iodine. Alkyl groups of R in these formulas are, for example, methyl group, ethyl group, propyl group, isopropyl group, n-butyl group, s-butyl group, isobutyl group, t-butyl group, n-pentyl group, n-hexyl group, n-heptyl group and n-octyl group. Alkoxyl groups of R in the formulas are substituents represented by —OX wherein X are, for example, the alkyl groups described above. Aryl groups in the formulas are, for example, phenyl group, naphthyl group and anthryl group. Alkyl groups in the alkylthio groups of R in the formulas are,- for example, the alkyl groups described above. Aryl groups in the arylthio groups of R in the formulas are, for example, the aryl groups described above.

Figure 1:
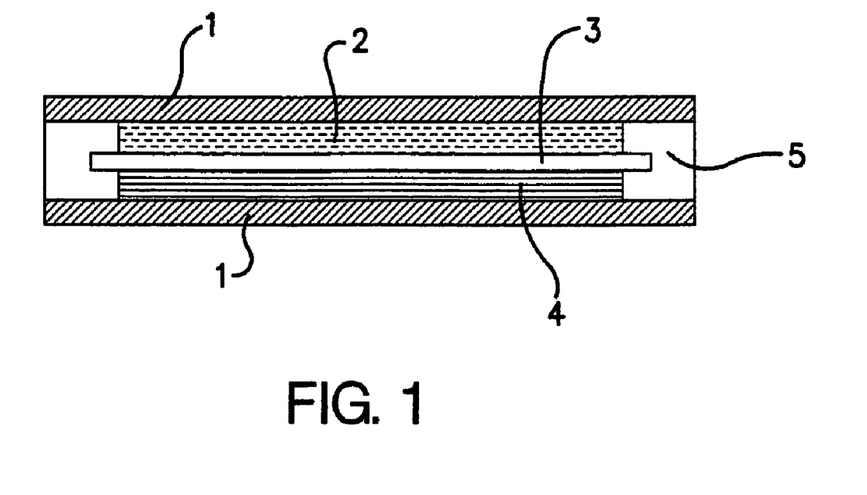
FIG. 1 is a schematic cross section showing an example of a battery and a capacitor of this invention.

FIG. 1 is a cross section of a secondary battery or a capacitor according to the present invention. A positive electrode material layer 2 (positive electrode) and a negative electrode material layer 4 (negative electrode), which are formed on a current collector 1 respectively, are arranged so as to face each other via a separator 3; there are provided a gasket 5 made of insulating rubber on the both sides of the layers wherein the positive electrode material 2 and the negative electrode material 4 are piled via the separator 3. The positive electrode material 2 and the negative electrode material 4 are each impregnated with an electrolytic solution containing protons or contain a gel electrolyte or a solid electrolyte containing protons. The negative electrode material is not particularly limited as long as it is active in the presence of protons.

A conductive auxiliary material is added to the electrodes to provide them with electrical conductivity, if necessary. The conductive auxiliary material is, for example, an electrical conductive material such as, crystal carbon, amorphous carbon, carbon black and graphite. Furthermore, binder may be added to keep moldability of the electrodes or to fix the electrodes on a current collector.

Mixing ratio of constituting materials in the electrodes described above may be arbitrary as long as the required characteristic is obtained. However, in the light of an efficiency per unit weight or volume a preferable composition ranges 30 to 95 wt % of an indole trimer, 5 to 50 wt % of a conductive auxiliary material and 0 to 20 wt % of a binder; 60 to 90 wt % of an indole trimer content is more preferable, because if the indole content is less than 30 wt %, an reaction efficiency per volume tends to decrease and if the indole content is more than 95 wt %, retaining a sufficient electrical conductivity as an electrode tends to be difficult.

In case of simultaneous use of a symmetric type trimer and a asymmetric type trimer as indole trimers, in the light of cycle characteristic the mixing ratio (weight basis) of more than 10% of the symmetric type trimer to 100% of the total amount of indole trimers is preferable, that of more than 20% is more preferable, that of more than 30% is much more preferable, and that of more than 50% is particularly preferable. In the light of capacity the mixing ratio of more than 10% of the asymmetric type trimer to 100% of the total amount of indole trimers is preferable, that of more than 20% is more preferable, that of more than 30% is much more preferable, and that of more than 50% is particularly preferable. In view of cycle characteristic and capacity, the mixing ratio may be adjusted appropriately, for example, a mixing ratio(symmetric type/asymmetric type) may be adjusted in the range of 10/90 to 90/10, moreover 20/80 to 90/10 or 20/80 to 80/20.

An aqueous solution or nonaqeous solution containing protons can be utilized as an electrolytic solution of the present invention. A proton content of $10^{-3}$ mol/l to 18 mol/l is preferable, that of $10^{-1}$ mol/l to 7 mol/l is more preferable. If the proton content is less than $10^{-3}$ mol/l, the reactivity of an electrode material tends to decrease because of the low concentration of proton and if the proton content is more than 18 mol/l, the activity of the electrode material tends to decrease or the electrode material tends to dissolve because of the strong acidity, and, therefore, a proton concentration outside the preferable range is not desirable. Alkali metal salts, alkaline earth metal salts, organic sulfonates, sulfates, nitrates, perchlorates, borates and surface active agents may be added to these electrolytic solutions containing protons, if necessary. A kind and concentration of the salt which is added to the aqueous solution or the nonaqueous solution may be decided appropriately.

Any material having an electrical insulating property and having or providing ionic conductivity, for example, a porous film made of Teflon or polyethylene is used as a separator. A film having proton conductivity may also be utilized. An electrolyte such as a gel electrolyte or a solid electrolyte as sandwiched between the electrodes may be substituted for the separator.

The asymmetric type trimer in the present invention is doped by an electrochemical or a chemical method as illustrated by the following reaction formula 1. $X^-$ in the formula represents a dopant ion, for example, a sulfate ion, a halide ion, a perchloric ion and a trifluoroacetate ion and is not limited to these ions as long as it provides the asymmetric type trimer with an electrochemical activity by doping. Furthermore, the asymmetric type trimer doped by this method generates an electrochemical reaction accompanied with an adsorption and desorption of a proton as illustrated by the following reaction formula 2. The secondary battery and the capacitor of the present invention utilizes as the electrode material the asymmetric type trimer which generates an electrochemical reaction concerned with only adsorption and desorption of a proton to receipt and release of electrons accompanied with an oxidation-reduction reaction. Since a transfer material during charge and discharge is only a proton, the secondary battery and the capacitor have less volume change of the electrodes accompanying the reaction and its cycle characteristic is excellent. Since the secondary battery and the capacitor have a high mobility of a proton and a rapid reaction rate, they have an excellent high rate characteristic, i.e., an excellent characteristic of a rapid charge and discharge.

Reaction formula 1

Reaction formula 2

In the above formula, each R represents a hydrogen atom, a halogen atom, hydroxyl group, carboxyl group, sulfonic acid group, sulfuric acid group, nitro group, cyano group, alkyl group, aryl group, alkoxyl group, amino group, alkylthio group and arylthio group, independently.

As is in the case with the asymmetric type trimer, the symmetric type trimer of the present invention is doped by an electrochemical or a chemical method as illustrated by the following reaction formula 3. $X^-$ in the formula represents a dopant ion, for example, a sulfate ion, a halide ion, a perchloric ion and a trifluoroacetate ion and is not limited to these ions as long as it provides the symmetric type trimer with an electrochemical activity by doping. Furthermore, the symmetric type trimer doped by this method generates an electrochemical reaction accompanied with an adsorption and desorption of a proton as illustrated by the following reaction formula 4. As is in the case with the asymmetric type trimer, the secondary battery and the capacitor of the present invention utilizes as the electrode material the asymmetric type trimer which generates an electrochemical reaction concerned with only adsorption and desorption of a proton to receipt and release of electrons accompanied with an oxidation-reduction reaction. Since a transfer material during charge and discharge is only a proton, the secondary battery and the capacitor have less volume change of the electrodes accompanying the reaction and its cycle characteristic is excellent. Since the secondary battery and the capacitor have a high mobility of a proton and a rapid reaction rate, they have an excellent high rate characteristic.

and discharge and its reduction in capacity is very low, i.e., it is possible to manufacture a battery having an excellent cycle characteristic.

Since a indole trimer can exist in a crystallized structure or in a similar state, its conductivity is higher and, furthermore, the transfer path of a reacting ion (i.e., a proton) is nearly linear and the decrease in mobility of the proton is less. On the other hand, the polymer material in the electrode is in an amorphous state and the transfer path of a reacting ion, i.e., polymer chains arranged at random divert the course of a proton forcibly. Therefore, since the indole trimer, particularly, the symmetric type trimer having a higher crystallinity has a higher conductivity and a higher transfer rate of ions and electrons, it is possible to manufacture a battery having an excellent high rate characteristic.

EXAMPLE

Hereinafter, examples of the battery in the present invention will be concretely described, however it may also be possible to construct a structure suitable for a capacitor by setting the mixing ratio between the symmetric trimer and the asymmetric trimer and the rate of charge-discharge properly.

Example 1

FIG. 1 shows a battery having the structure described above which was manufactured according to a usual Reaction formula 3　　　　　Reaction formula 4

In the above formula, each R represents a hydrogen atom, a halogen atom, hydroxyl group, carboxyl group, sulfonic acid group, sulfuric acid group, nitro group, cyano group, alkyl group, aryl group, alkoxyl group, amino group, alkylthio group and arylthio group, independently.

An indole trimer, which has a constant molecular weight and molecular size, is different from an active material of a polymer having a molecular weight distribution and can exist in a crystallized structure or in a similar state in an electrode. The indole trimer has a condensed polycyclic structure having a resonance structure over the entire main skeleton and, therefore, its chemical stability is higher than that of an electrode material which has not such a structure. Furthermore, since the molecular structure of the symmetric type trimer is symmetric among indole trimers, the symmetric type trimer is regularly arranged and can exist in a highly crystallized structure or in a similar state compared with the asymmetric type trimer and, therefore, the crystallinity of the symmetric type trimer is very high. Therefore, the indole trimer, particularly the symmetric type trimer, has a characteristic of less deterioration after repeating charge method. Gaskets 5 made of insulating rubber were used as exterior material and current collectors 1 were made of conducting rubber. A separator constituted of porous film impregnated with an electrolytic solution of 40% sulfuric acid was used.

In the positive electrode material layer 2, the following materials were mixed: as active materials of electrode 15 wt % of the symmetric type trimer, i.e., 6-nitroindole trimer which is represented by general formula 1 wherein each R in the $6^{th}$ position of each three indole structure units is nitro group and the other Rs are hydrogen atoms; 60 wt % of the asymmetric type trimer, i.e., 6-nitroindole trimer which is represented by general formula 2 wherein each R in the $6^{th}$ position of each three indole structure units is nitro group and the other Rs are hydrogen atoms (i.e., the weight ratio of the symmetric type trimer to the asymmetric type trimer is 2 to 8); 20 wt % of carbon fibers grown in gas phase as a conductive auxiliary material; and 5 wt % of organic binder.

Quinoxaline polymer represented by the formula describe below was used as an active material in the negative electrode material layer 4 and carbon black was used as a conductive auxiliary material therein. When an indole trimer is used in the positive electrode, an active material used in the negative electrode is not limited to the material if it is active electrochemically and undergoes a reversible oxidation-reduction reaction. A mixing ratio of an active material to a conductive auxiliary material constituting electrodes was chosen as weight ratio of 75:25 (an active material: a conductive auxiliary material) both in the positive and the negative electrodes.

Figure 2:
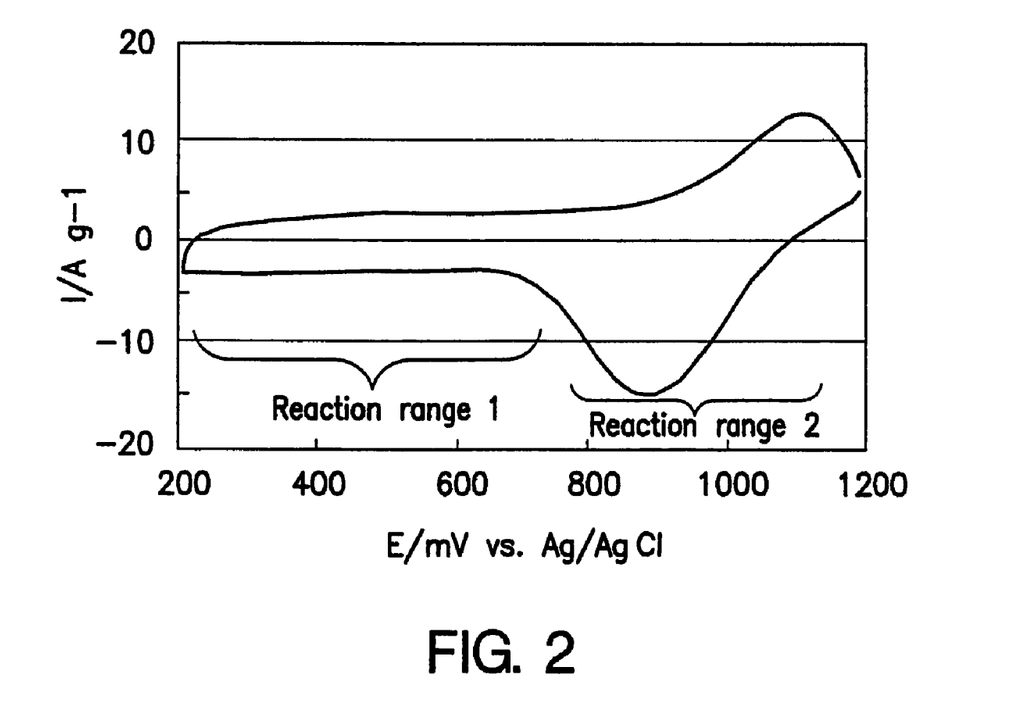
FIG. 2 is the cyclic voltamogram of the positive electrodes of the battery in the example 1.

FIG. 2 shows a cyclic voltamogram (hereinafter described as "CV") of the positive electrode material layer 2 in an acid aqueous solution. In the reaction range 1 (200–800 mV vs. Ag/AgCl), doping and dedoping of dopant ions occur as represented by the reaction formula 1 or 3 and an electric current associated with them is observed. In the reaction range 2 (800–1200 mV vs. Ag/AgCl), adsorption and desorption of protons occur as represented by the reaction formula 2.

Figure 3:
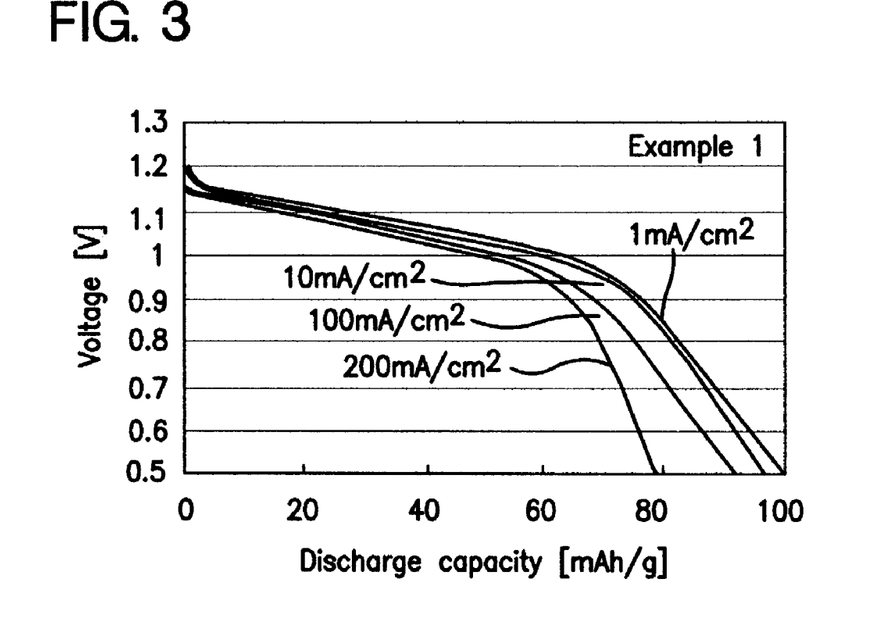
FIG. 3 is the graph showing the results of charge and discharge tests (discharge curves) of the battery in the example 1.

Charge and discharge tests were conducted to evaluate the battery manufactured. A charging was conducted up to 1.2 V at a constant electric current of 10 MA/cm$^2$ and discharging was conducted at a constant electric currents of 1 mA/cm$^2$ to 200 mA/cm$^2$. The results of the tests are shown in FIG. 3. The discharge capacities are based on the weight of active material. The tests results of discharge capacities down to 0.9V are shown in Table 1.

An increase in a discharge current from 1 MA/cm$^2$ to 200 mA/cm$^2$ resulted in a decrease in the discharge capacity from 77 mA/g to 65 mA/g with a decreasing rate of only 16%. The capacity at the discharge current of 1 MA/cm$^2$ in Example 1 decrease slightly compared to that of the battery in Comparative Example 1, however, since the decreasing rate in Comparative Example 1 at 200 mA/cm$^2$ was 21%, the high rate characteristic improved as much as 5% The battery of the present invention wherein 15 wt % of the symmetric type trimer is mixed in the positive electrode so that the weight ratio between the symmetric type trimer and the asymmetric type trimer is 2 to 8 exhibited an excellent high rate characteristic.

Cycle tests were conducted repeating charging up to 1.2 V and discharging down to 0.9 V at a constant charge-discharge current of 10 mA/cm$^2$. As a result of the tests the number of the cycles was 32000 until the final capacity reached 80% of the initial capacity. The battery of the present invention wherein 15 wt % of the symmetric type trimer is mixed in the positive electrode so that the weight ratio between the symmetric type trimer and the asymmetric type trimer is 2 to 8 exhibited an excellent cycle characteristic.

Since the symmetric property of molecular structure of the symmetric type trimer is very high, the symmetric type trimer is regularly arranged. Therefore, the symmetric type trimer can exist in a crystallized structure or in a similar state and, thus, the crystallinity of the symmetric type trimer is very high. on the other hand, the symmetric property of molecular structure of the asymmetric type trimer is lower and its crystallinity becomes lower. Therefore, the conductivity of the symmetric type trimer is higher than that of the asymmetric type trimer. Since the symmetric type trimer exists in a crystal structure or in a similar state in an electrode, the transfer path of a reacting ion (i.e., a proton) in the electrode is nearly linear and the decrease in mobility of the proton is less. Therefore, it is possible to manufacture a battery having an excellent high rate characteristic because of the higher conductivity and the higher transfer rate of ions and electrons.

Since a symmetric type trimer exists in a crystal structure or in a similar state in an electrode, when doping treatment is conducted which is necessary for charging a battery, it is considered that a dopant is doped into the symmetric type trimer having a high crystallinity with more difficulty. Therefore, the capacity of the symmetric type trimer is lower than that of the asymmetric type trimer. However, since the symmetric type trimer has a high crystallinity and an excellent high rate characteristic, the capacity of the symmetric trimer is higher than that of the asymmetric type trimer in case of discharging at a large current.

Since a symmetric type trimer exists in a crystal structure or in a similar state in an electrode, chemical stability of the symmetric type trimer is very high and it hardly deteriorates. Therefore, it is possible to manufacture a battery having an excellent cycle characteristic.

Example 2

In the positive electrode material layer 2, the following materials were mixed: as active materials of electrode 60 wt % of the symmetric type trimer, i.e., 6-nitroindole trimer; 15 wt % of the asymmetric type trimer, i.e., 6-nitroindole trimer (i.e., the weight ratio of the symmetric type trimer to the asymmetric type trimer is 8 to 2); 20 wt % of carbon fibers grown in gas phase as a conductive auxiliary material; and 5 wt % of organic binder.

Figure 4:
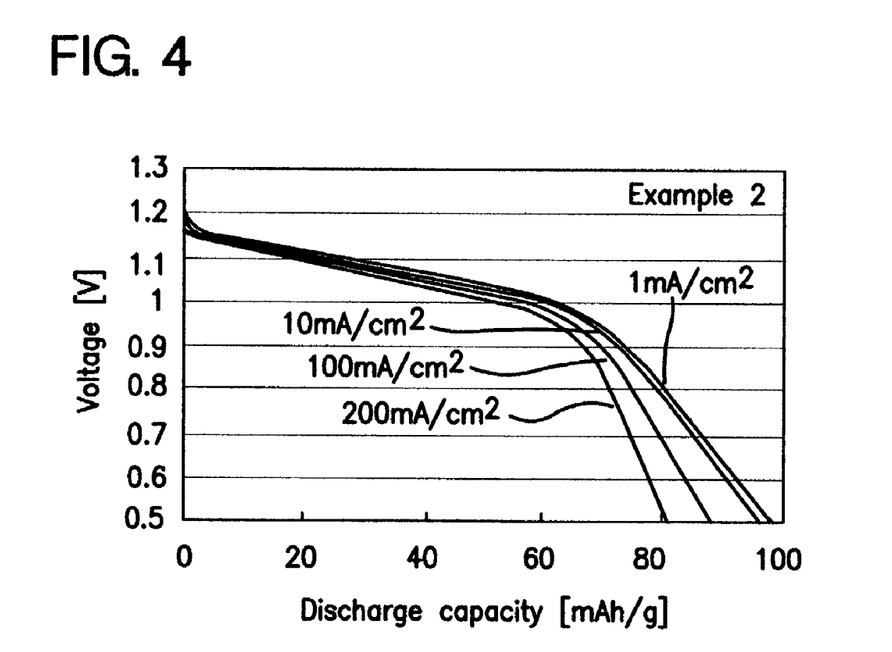
FIG. 4 is the graph showing the results of charge and discharge tests (discharge curves) of the battery in the example 2.

A battery was manufactured according to the same method as in Example 1 except for utilizing the positive electrode material layer as described above, and charge and discharge tests were conducted. The results of the tests are shown in FIG. 4 and the test results of discharge capacities down to 0.9 V are shown in Table 1. An increase in a discharge current from 1 mA/cm$^2$ to 200 mA/cm$^2$ resulted in a decrease in the discharge capacity from 74 mAh/g to 67 mAh/g with a decreasing rate of only 9%.

Cycle tests were conducted repeating charging up to 1.2 V and discharging down to 0.9 V at a constant charge-discharge current of 10 mA/cm$^2$. As a result of the tests the number of the cycles was 36000 until the final capacity reached 80% of the initial capacity.

In the battery of Example 2 wherein 60 wt % of the symmetric type trimer is mixed in the positive electrode so that the weight ratio between the symmetric type trimer and the asymmetric type trimer is 8 to 2, an increase in a discharge current from 1 mA/cm$^2$ to 200 mA/cm$^2$ resulted in a decreasing rate of only 9% in the discharge capacity and improved a high rate characteristic as much as 12% compared with that of Comparative Example 1. The cycle characteristic was 36000 cycles improving as much as 5000 cycles compared with that of Comparative Example 1.

Example 3

A similar battery was manufactured as in Example 2 except for using a propylenecarbonate solution as an electrolytic solution wherein 1 mol/l of tetraethylammonium tetrafluoroborate and 0.1 mol/l of trifluoroacetic acid were dissolved (hereinafter described as "PC solution").

Figure 5:
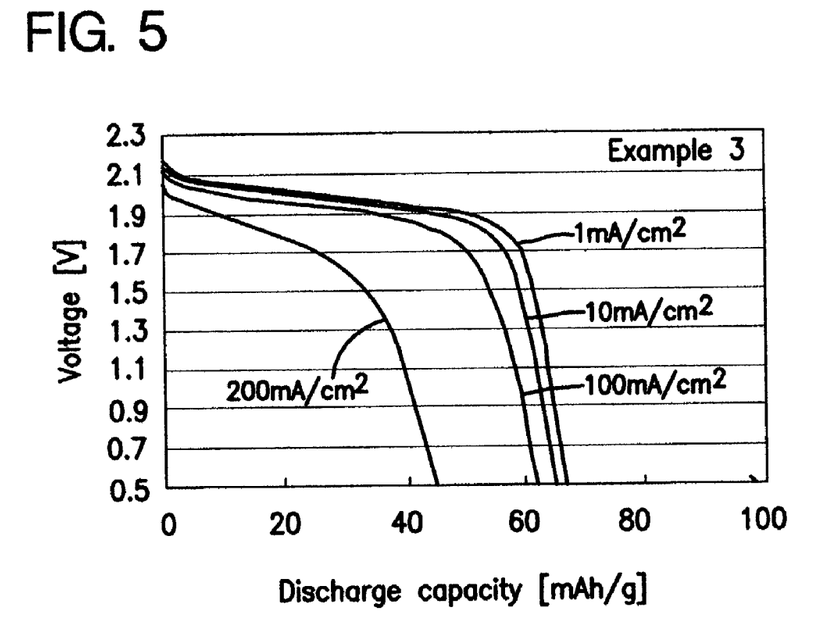
FIG. 5 is the graph showing the results of charge and discharge tests (discharge curves) of the battery in the example 3.

Charge and discharge tests were conducted to evaluate the battery manufactured. The battery was charged up to 2.2 V at a constant current of 10 mA/cm$^2$ and discharged at constant currents of 1 mA/cm$^2$ to 200 mA/cm$^2$. The results of the tests are shown in FIG. 5 and the data of the discharge capacities down to 0.5 V are listed in Table 1. An increase in a discharge current from 1 mA/cm$^2$ to 200 mA/cm$^2$ results in a decrease in a discharge capacity from 67 mAh/g to 45 mAh/g indicating 33% decreasing rate of the capacity.

Cycle tests were conducted repeating charging up to 2.2 V and discharging down to 0.5 V at a constant charge-discharge current of 10 mA/cm$^2$. As a result of the tests the number of cycles was 21000 until the final capacity reached 80% of the initial capacity.

In the battery of Example 3 wherein 60 wt % of the symmetric type trimer is mixed in the positive electrode so that the weight ratio between the symmetric type trimer and the asymmetric type trimer is 8 to 2, an increase in a discharge current from 1 mA/cm$^2$ to 200 mA/cm$^2$ resulted in a decreasing rate of 33% in the discharge capacity, however, the high rate characteristic of the battery in this example improved 11% compared with that of the battery in Comparative Example 2 wherein the same PC solution is utilized. The cycle characteristic was 21000 cycles improving as much as 2000 cycles compared with that of Comparative Example 2.

Example 4

In the positive electrode material layer 2, the following materials were mixed: as an active material of electrode 75 wt % of the symmetric type trimer, i.e., 6-nitroindole trimer; 20 wt % of carbon fibers grown in gas phase as a conductive auxiliary material; and 5 wt % of organic binder.

A battery was manufactured according to the same method as in Example 1 except for utilizing the positive electrode material layer as described above, and charge and discharge tests were conducted. The test results of discharge capacities down to 0.9 V are shown in Table 1. An increase in a discharge current from 1 mA/cm$^2$ to 200 mA/cm$^2$ resulted in a decrease in the discharge capacity from 73 mAh/g to 70 mAh/g with a decreasing rate of only 4%.

Cycle tests were conducted repeating charging up to 1.2 V and discharging down to 0.9 V at a constant charge-discharge current of 10 mA/cm$^2$. As a result of the tests the number of cycles was 41000 until the final capacity reached 80% of the initial capacity.

In the battery of Example 4 wherein 75 wt % of the symmetric type trimer is mixed in the positive electrode so that the weight ratio between the symmetric type trimer and the asymmetric type trimer is 10 to 0, an increase in a discharge current from 1 mA/cm$^2$ to 200 mA/cm$^2$ resulted in a decreasing rate of only 4% in the discharge capacity and improved a high rate characteristic as much as 17% compared with that of Comparative Example 1. The cycle characteristic was 41000 cycles improving as much as 10000 cycles compared with that of Comparative Example 1.

Comparative Example 1

In the positive electrode material layer 2, the following materials were mixed: as an active material of electrode 75 wt % of the asymmetric type trimer, i.e., 6-nitroindole trimer; 20 wt % of carbon fibers grown in gas phase as a conductive auxiliary material; and 5 wt % of organic binder.

Figure 6:
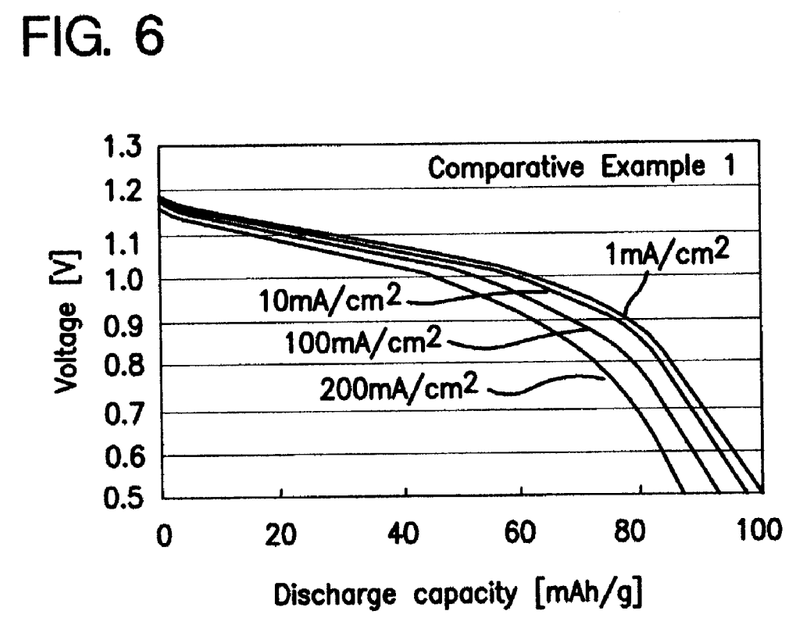
FIG. 6 is the graph showing the results of charge and discharge tests (discharge curves) of the battery in the comparative example 1.

A battery was manufactured according to the same method as in Example 1 except for utilizing the positive electrode material layer as described above, and charge and discharge tests were conducted. The results of the tests are shown in FIG. 6 and the test results of discharge capacities down to 0.9 v are shown in Table 1. An increase in a discharge current from 1 mA/cm$^2$ to 200 mA/cm$^2$ resulted in a decrease in the discharge capacity from 78 mAh/g to 62 mAh/g with a decreasing rate of 21%.

Cycle tests were conducted repeating charging up to 1.2 V and discharging down to 0.9 V at a constant charge-discharge current of 10 mA/cm$^2$. As a result of the tests the number of the cycles was 31000 until the final capacity reached 80% of the initial capacity.

Comparative Example 2

A similar battery was manufactured as in Comparative Example 1 except for using a propylenecarbonate solution as an electrolytic solution wherein 1 mol/l of tetraethylammonium tetrafluoroborate and 0.1 mol/l of trifluoroacetic acid were dissolved (hereinafter described as "PC solution").

Figure 7:
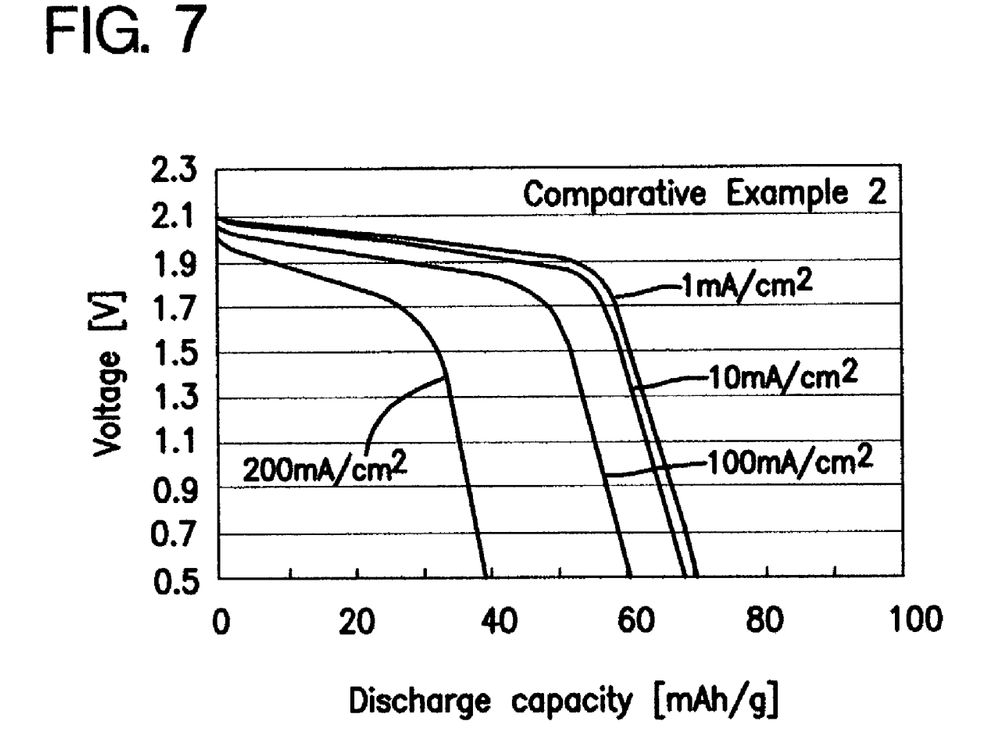
FIG. 7 is the graph showing the results of charge and discharge tests (discharge curves) of the battery in the comparative example 2.

Charge and discharge tests were conducted according to the same method as in Example 3. The results of the tests are shown in FIG. 7 and the test results of discharge capacities down to 0.5 V are shown in Table 1. An increase in a discharge current from 1 mA/cm$^2$ to 200 mA/cm$^2$ resulted in a decrease in the discharge capacity from 70 mAh/g to 39 mAh/g with a decreasing rate of 44%.

Cycle tests were conducted repeating charging up to 2.2 V and discharging down to 0.9 V at a constant charge-discharge current of 10 mA/cm$^2$. As a result of the tests the number of cycles was 19000 until the final capacity reached 80% of the initial capacity.

TABLE 1

| | Mixing ratio [symmetric-type/ asymmetric-type] | Electrode conductivity [S/cm] | Electrolytic solution | Voltage [V] | Capacity [mAh/g] | | | | Cycle characteristic [cycle] |
| | | | | | Charge-discharge current density 1 mA/cm$^2$ | Charge-discharge current density 10 mA/cm$^2$ | Charge-discharge current density 100 mA/cm$^2$ | Charge-discharge current density 200 mA/cm$^2$ | |
| --- | --- | --- | --- | --- | --- | --- | --- | --- | --- |
| Example 1 | 2/8 | 4.4 | Aqueous solution | 1.2 | 77 | 76 | 69 | 65 | 32000 |
| Example 2 | 8/2 | 6.1 | Aqueous solution | 1.2 | 74 | 74 | 70 | 67 | 36000 |

TABLE 1-continued

| | Mixing ratio [symmetric-type/ asymmetric-type] | Electrode conductivity [S/cm] | Electrolytic solution | Voltage [V] | Capacity [mAh/g] | | | | Cycle characteristic [cycle] |
| | | | | | Charge-discharge current density 1 mA/cm² | Charge-discharge current density 10 mA/cm² | Charge-discharge current density 100 mA/cm² | Charge-discharge current density 200 mA/cm² | |
|---|---|---|---|---|---|---|---|---|---|
| Example 3 | 8/2 | 6.1 | PC solution | 2.2 | 67 | 66 | 63 | 45 | 21000 |
| Example 4 | 10/0 | 7.1 | Aqueous solution | 1.2 | 73 | 73 | 72 | 70 | 41000 |
| Comparative Example 1 | 0/10 | 4.2 | Aqueous solution | 1.2 | 78 | 76 | 68 | 62 | 31000 |
| Comparative Example 2 | 0/10 | 4.2 | PC solution | 2.2 | 70 | 68 | 60 | 39 | 19000 |

What is claimed is:

1. A secondary battery comprising as an active material of an electrode a compound having a trimer structure comprising three structure units of one or more kind of indole compounds selected from indole and indole derivatives, and having a condensed polycyclic structure having a six-membered ring composed of atoms having a second and a third position in each of the three structure units, wherein the active material comprises a first compound having a trimer structure wherein bonds between the structure units are formed between the second position of one structure unit and the third position of the other structure unit and a second compound having a trimer structure comprising a bond formed between the second position of one structure unit and the second position of the other structure unit of the trimer structure, and a proton is utilized as a charge carrier of the first compound and the second compound.

2. A secondary battery comprising as an active material of an electrode a first compound represented by the following general formula (1):

wherein each R represents a hydrogen atom, a halogen atom, hydroxyl group, carboxyl group, sulfonic acid group, sulfuric acid group, nitro group, cyano group, alkyl group, aryl group, alkoxyl group, amino group, alkylthio group and arylthio group, independently and a second compound represented by the following general formula(2):

wherein each R represents a hydrogen atom, a halogen atom, hydroxyl group, carboxyl group, sulfonic acid group, sulfuric acid group, nitro group, cyano group, alkyl group, aryl group, alkoxyl group, amino group, alkylthio group and arylthio group, independently, and utilizing a proton as a charge carrier of the first compound and the second compound.

3. The secondary battery as claimed in claim 1, wherein the content ratio based on weight of the first compound and the second compound is that the content of the first compound is equal to or more than 10% of the total amount 100% of these compounds.

4. The secondary battery as claimed in claim 1, wherein the receipt and release of electrons in accordance with oxidation-reduction reaction of the compounds are carried out only by the bonding and release of the proton of the compounds.

5. The secondary battery as claimed in claim 1 comprising an aqueous solution or a nonaqueous solution containing $10^{-3}$ mol/l to 18 mol/l of proton as an electrolytic solution.

6. The secondary battery as claimed in claim 2, wherein the content ratio based on weight of the first compound and the second compound is that the content of the first compound is equal to or more than 10% of the total amount 100% of these compounds.

7. The secondary battery as claimed in claim 2, wherein the receipt and release of electrons in accordance with oxidationreduction reaction of the compounds are carried out only by the bonding and release of the proton of the compounds.

8. The secondary battery as claimed in claim 2 comprising an aqueous solution or a non-aqueous solution containing $10^{-3}$ mol/l to 18 mol/l of proton as an electrolytic solution.

* * * * *